G. A. EGAN.
Stock-Cars.

No. 135,532.  Patented Feb. 4, 1873.

Attest  Inventor

UNITED STATES PATENT OFFICE.

GILES A. EGAN, OF COVINGTON, KENTUCKY.

IMPROVEMENT IN STOCK-CARS.

Specification forming part of Letters Patent No. 135,532, dated February 4, 1873.

*To all whom it may concern:*

Be it known that I, GILES A. EGAN, of Covington, Kenton county, State of Kentucky, have invented a certain new and useful Improvement in Cars for Transporting Live Stock, of which the following is a specification:

Nature and Objects of Invention.

My invention consists of peculiar devices for watering and feeding the animals while on the cars, and devices for preventing the animals from lying down while in transit.

Description of the Accompanying Drawing.

Figure 1:
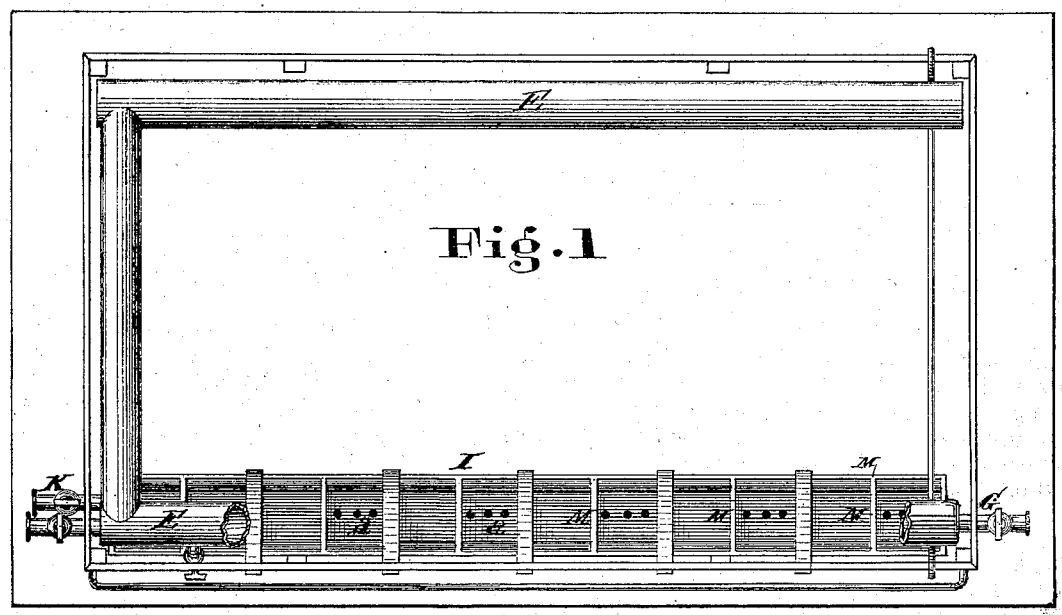
Figure 2:
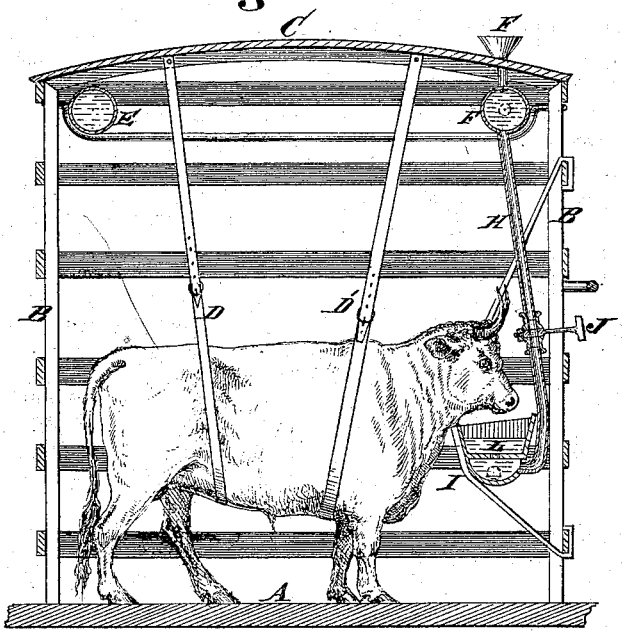

Figure 1 is a plan, partly in section, of a car embodying my invention. Fig. 2 is a cross-section of the same.

General Description.

A is the platform or floor of the car, B the sides, and C the roof of the same. D D' are suspended loops of flexible material, two of which are used to pass under each animal to partly support his weight and thus prevent him from lying down while in transit. E is an inclosed water-chamber extending preferably on three sides of the car. It is adapted to receive its supply of water at the regular water-stations of the road through pipe F. This supply may at any time be discharged through valve G to prevent freezing, but its object is to form a supply for the animals to be used as required. A pipe, H, passes from this tank or chamber E to the under side of a feeding and watering trough, I, of peculiar construction, for the purpose of supplying said trough with water for the use of the animals. This water-supply pipe H is fitted with a cock or valve, J, to govern the flow of water in accordance with the desires of the animals in the car. The water in the trough may be discharged at any time through valve-governed pipe K. The trough has a false bottom or diaphragm, L, above which it is divided into separate chambers or cells by partitions M. Alternate cells are perforated, as shown at *a*, at the bottom, so that the water (which is received throughout the entire length of the trough I in the space below the diaphragm L) can flow into these cells to the desired height, when it is then stopped. Between the water-cells, feed-cells are provided, the bottoms of which are not perforated; the water is therefore excluded and the cells are confined to use as feeding-cells. The trough is so attached to the car that it may be removed at any time when necessary to change the use of the car.

Claim.

In the described connection with a cattle-car, the elevated water-tank E and trough I, the latter being divided and partitioned, as shown, to form alternate feed and water cells, substantially as and for the purpose specified.

In testimony of which invention I hereunto set my hand.

G. A. EGAN.

Witnesses:
H. G. WEBBER,
J. L. WARTMANN.